July 8, 1952 S. F. WINCHELL 2,602,213
BAR STOCK FEEDING MECHANISM
Filed July 24, 1947 3 Sheets-Sheet 1

INVENTOR.
STERLING F. WINCHELL
BY
Kwis, Hudson, Boughton & Williams
ATTORNEYS

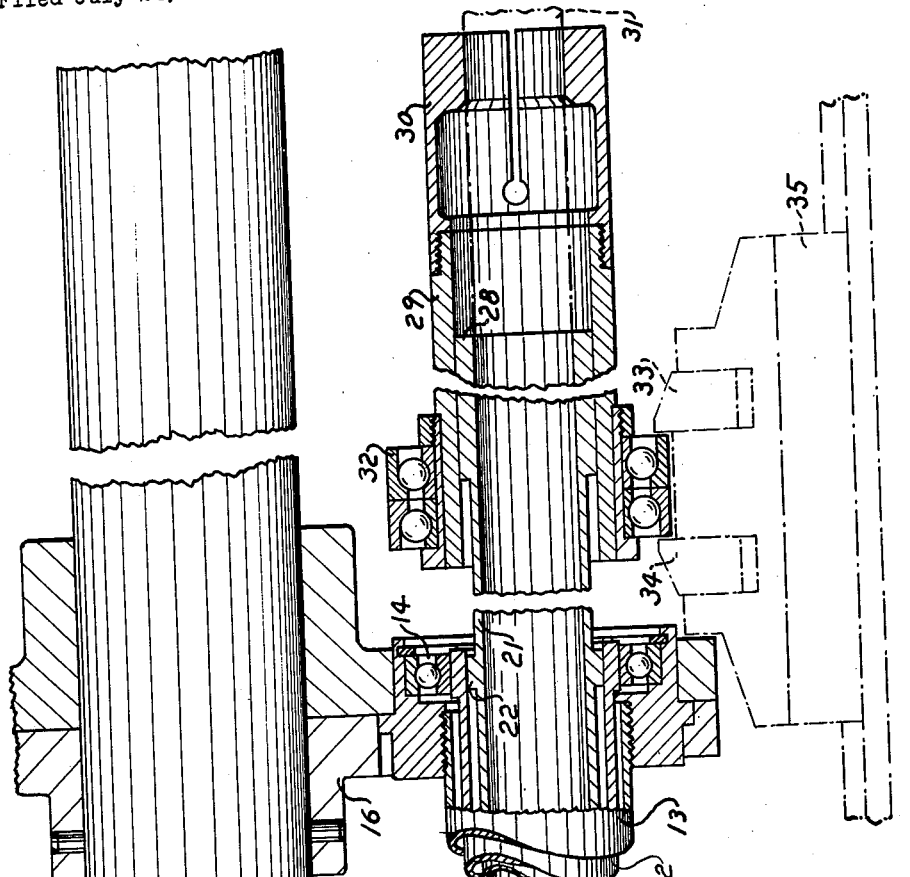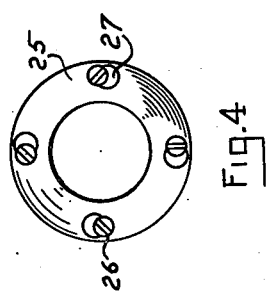

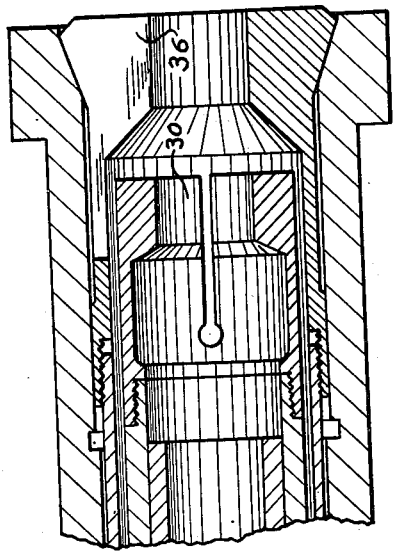
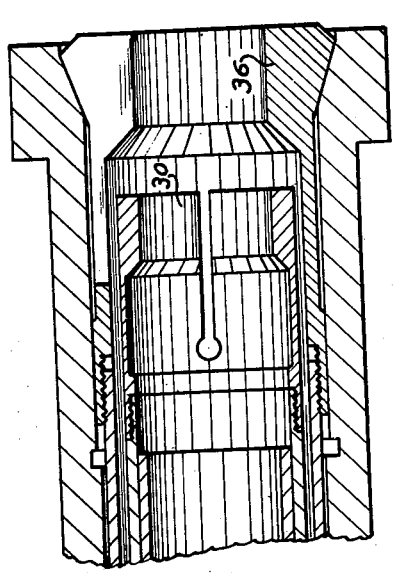
Fig. 5
Fig. 6
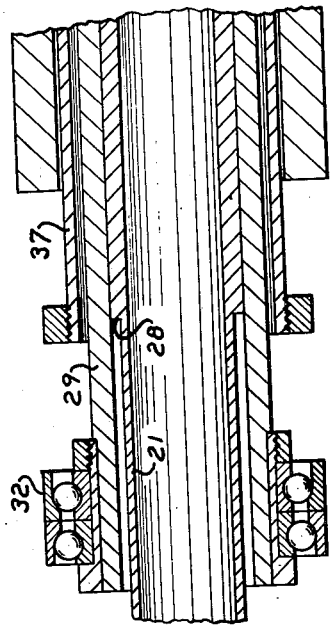
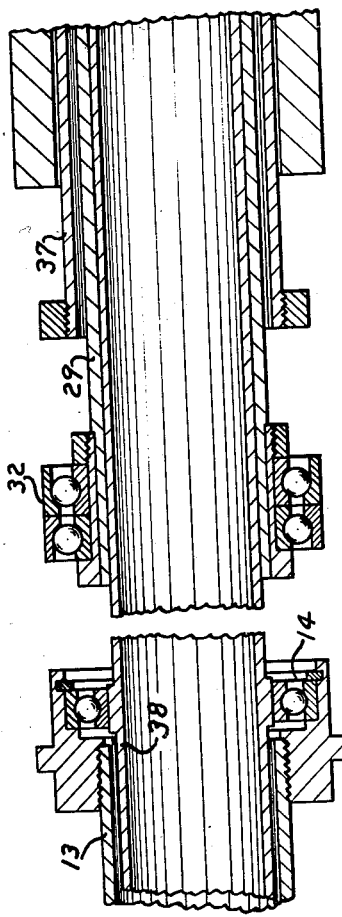
INVENTOR.
STERLING F. WINCHELL
BY
Kwis, Hudson, Boughton & Williams
ATTORNEYS Patented July 8, 1952

2,602,213

UNITED STATES PATENT OFFICE 2,602,213

BAR STOCK FEEDING MECHANISM

Sterling F. Winchell, East Cleveland, Ohio, assignor to The Warner & Swasey Company, Cleveland, Ohio, a corporation of Ohio Application July 24, 1947, Serial No. 763,399

4 Claims. (Cl. 29—62)

This invention relates to a machine tool and more particularly to an improved means for supporting and feeding bar stock to an automatic chucking machine tool.

An object of the invention is to provide a novel and improved bar supporting and feeding means for an automatic chucking machine tool so constructed and arranged that the bar stock is supported without contact with th ebores of the spindle or the collet actuating sleeve in the spindle bore, thereby substantially eliminating vibration and objectionable noise.

Another object of the invention is to provide an improved bar stock supporting and feeding means for a machine tool by virtue to which stock of various sizes may be readily supported and fed to the tool without contact between the stock and the bore of the machine tool spindle, or the collet chuck actuating sleeve positioned in said bore.

A further object of the invention is to provide a bar stock feeding mechanism for a machine tool in which the feed finger tube of the feeding mechanism is supported independently of the spindle bore and the collet chuck actuating sleeve in the bore in the machine tool spindle.

A still further object of the invention is to provide an improved bar stock feeding mechanism for a machine tool in which the feed finger tube is supported independently of the bore in the spindle of the machine tool and independently of the collet chuck actuating sleeve, thereby eliminating vibrations and noise.

The invention further resides in certain novel features of construction, combination and arrangement of parts, and further objects and advantages thereof will be apparent to those skilled in the art to which it pertains from the following description of the present preferred embodiment, and a modification thereof, described with reference to the accompanying drawings in which similar reference characters represent corresponding parts throughout the several views and in which:

Fig. 3 is a fragmentary sectional view, on an enlarged scale, taken substantially on the section line 3—3 of Fig. 2;

Fig. 4 is a detached end elevational view of the locking ring illustrated in Fig. 3;

Fig. 5 is a fragmentary sectional view of the forward portion of the improved stock feeding mechanism illustrating the manner in which it is positioned within the bore of a spindle of the machine tool; and, Fig. 6 is a view similar to Fig. 5 illustrating a modified form of the invention.

Figure 1:
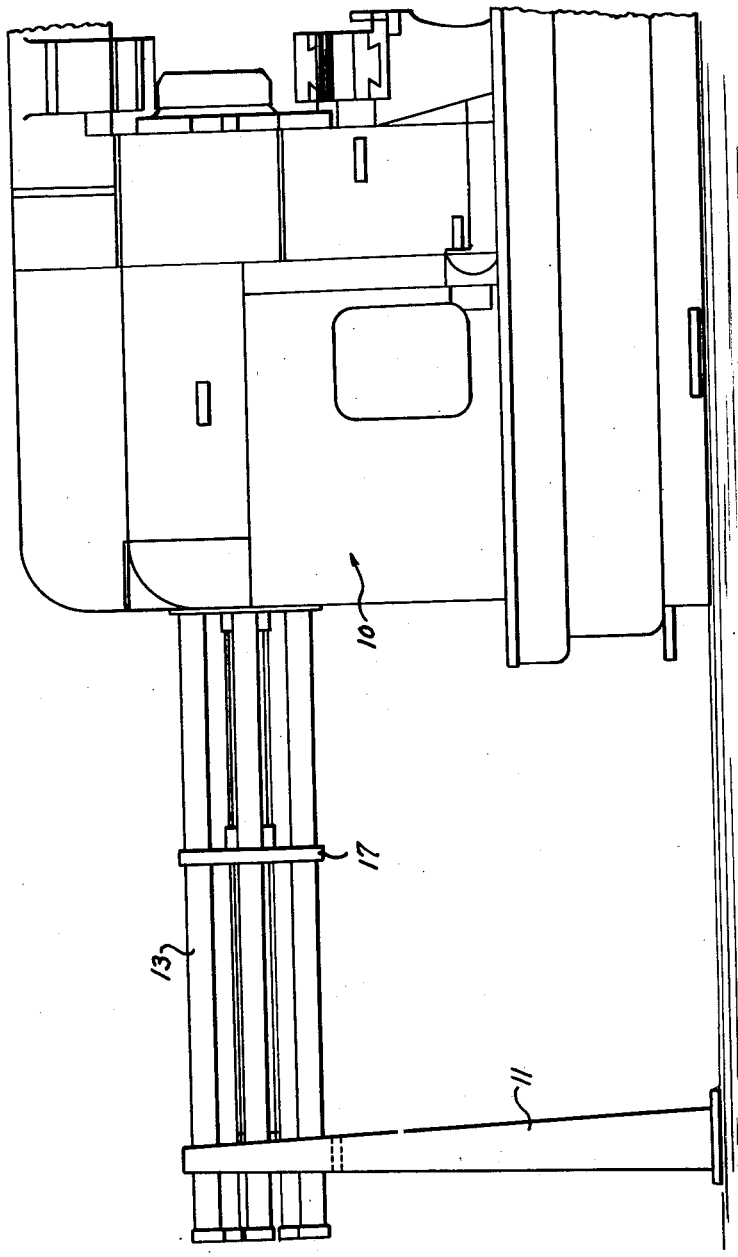
Fig. 1 is a fragmentary front elevational view of a multiple spindle, automatic chucking, machine tool showing the novel and improved bar feeding mechanism of this invention attached thereto.
Figure 2:
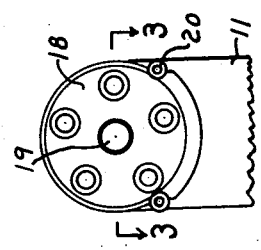
Fig. 2 is an end elevational view of the improved bar feeding mechanism and a portion of the stock stand, the view being taken from the left of Fig. 1.

In Fig. 1 of the drawings, the reference numeral 10 designates generally a multiple spindle, automatic chucking, machine tool which may be of conventional construction, the details of which need not be described since they do not per se form a part of this invention. In employing such a machine tool, bar stock is fed to its hollow spindles by a bar stock feeding mechanism and, since the bar stock is of considerable length, it must be supported exteriorly of the machine tool by stock supporting tubes and one or more standards 11. In accordance with this invention the bar stock supporting tubes 12 of which there is one for each spindle of the machine, there being five illustrated in the drawings, are rotatably supported within tubular housings 13 by means of ball bearings 14 and 15. As shown in Fig. 3, the tubular housings 13 comprise elongated tubes the ends of which are externally threaded with the housings for the bearings 14 and 15 screwed thereon. These housing tubes 13 are supported in spaced openings in a plurality of indexible disks 16, 17 and 18 which are connected with an indexing shaft 19 extending within the housing of the machine tool 10. The shaft 19 is connected with, or is formed as an extension of, the indexible spindle carrier of the machine tool 10 and hence the supporting disks and housing tubes are indexible with the spindles of the machine 10 as is well known in the art, the axes of the tubes 13 extending in parallel relationship and in axial alignment with the spindles. The rear risk 18 is supported in a conventional manner by means of rollers 20 carried by the standard 11. Although only one supporting standard 11 has been shown it will be apparent that more than one may be utilized. For example, the indexible disk 17 may be supported by a standard in the same manner as the disk 18.

It will be seen, therefore, that the housing tubes 13 are normally stationary, but are bodily indexed simultaneously with the spindles of the machine tool, when the shaft 19 is indexed so that the housing tubes remain in axial alignment with the spindles. As previously mentioned, the stock supporting tubes 12 are rotatably mounted within the housing tubes 13 and within each stock supporting tube is removably positioned a filler tube 21, the outer surface of the latter having spaced bearing portions 22 for engagement with the interior of the stock supporting tube 12 to provide proper axial alignment of the filler tube within the stock supporting tube. The rear end of each filler tube 21 is provided with an outwardly extending tongue or projection 23 received within a slotted opening 24 in the corresponding stock supporting tube 12 so that the filler tube and stock supporting tube are keyed to rotate together as a unit, the outer end of each stock supporting tube being provided with a removable retaining ring 25 for preventing longitudinal displacement of the filler tube.

The retaining rings 25 may be readily removed from the stock supporting tubes to permit changing of the filler tubes when bar stock of a different cross section is to be utilized. This is desirable since the internal diameters of the filler tubes should be such that the bar stock has a sliding fit therein. One convenient mode of supporting the retaining rings upon the stock supporting tubes is illustrated in Fig. 4 as comprising a plurality of screws 26 threaded into the outer end of each stock supporting tube 12, the heads of the screws being received within slots projecting from openings 27 in the rings, the said opening having a diameter sufficient to freely pass over the heads of the screws. It will be readily seen that by slightly loosening the screws 26 and partially rotating the ring 25 the latter may be readily removed, thereby permitting the filler tube 21 to be withdrawn from the stock supporting tube when it is desired to replace the filler tube.

The forward end of each filled tube 21 projects beyond the corresponding stock supporting tube 12 and is provided with an enlarged bearing surface 28 upon which a finger tube 29 is slidably supported. The forward end of each finger tube 29 has a conventional spring finger unit 30 attached thereto, the fingers of which resiliently grip the bar stock 31 to feed the latter when the bar stock is freed by the collet chuck carried in the cooperating spindle of the machine tool. To effect reciprocation of the finger tubes 29 at the proper time, each finger tube is provided with bearings 32 the outer race of which forms a shoulder which is adapted to be received between spaced projections 33, 34 upon a reciprocating slide member 35. The member 35 is reciprocated in timed relationship with the operation of the machine tool so that the finger tube 29 cooperating therewith is advanced carrying with it the bar stock 31 therein when the corresponding collet chuck 36 is released therefrom. After the bar stock has been thus advanced and the collet chuck has been actuated to again grip the bar stock, the slide 35 is moved in the opposite direction, to the left as shown in Fig. 3, during which movement the spring fingers 30 slide upon the bar stock, the finger tube 29 being returned to its initial position to await further feeding movement. As will be readily understood, the indexing of the bar feeding mechanism, effected by the indexing of the shaft 19, will move the finger tube, which has just been actuated, out of cooperative relationship with the slide 35, the collar provided by the bearings 32 on the next succeeding finger tube being moved into position between the projections 33 and 34 of the slide at the end of the indexing movement. Hence, feeding of the bar stock within a given filler tube occurs only when the finger tube of the latter is in a predetermined indexed position.

Referring now to Fig. 5, it will be observed that the finger tube 29 extends freely within the collet actuating sleeve 37 of the collet chuck 36 and is not supported thereby, the said finger tube being supported solely by the bearing portion 28 of the filler tube 21 and by the extending portion of the bar stock which is axially aligned with and gripped by the collet. Consequently, the finger tube cannot contact the interior of the collet actuating sleeve 37, which is slidably supported in the spindle, even though it may move in a slightly eccentric path during rotation, since considerable clearance is provided between the interior of the sleeve 37 and the exterior of the finger tube 29. Therefore, the usual vibration and noise due to the striking of the finger tube against the spindle bore or the collet actuating sleeve during a machining operation is eliminated. The finger tube is held from appreciable deflection, and from striking the interior of the collet actuating sleeve 37, because the bar stock is gripped at the forward end by the collet chuck 36 and, since the forward portion of the finger tube 29 is at all times in relatively close proximity to the collet chuck, the bar stock itself holds the forward portion of the finger tube in axial alignment during the machining operation. The rear portion of the finger tube is held in axial alignment by its support upon the filler tube 21 which, it will be remembered, is supported independently of the spindle or collet actuating sleeve.

The internal diameter of the filler tube 21 should be such that the bar stock has a sliding fit therein without appreciable play and when the bar stock diameter is changed the filler tube 21 may be replaced with one having a bore or opening therethrough closely corresponding with the cross section of the bar stock being employed or, if desired, a second filler tube may be inserted within the original filler tube 21.

Referring now to Fig. 6 of the drawings, there is illustrated a modification of the stock feeding mechanism shown in Figs. 1 to 5. This modified mechanism employs the same housing tubes 13 supported in the indexible disks and provided with bearings 14 in the same manner as shown in Figs. 1 and 3. Hence, the illustration of these features is not repeated, only one unit of the feeding mechanism being shown. In this form of the invention a stock supporting tube 38 is employed which is supported within the housing tube 13 in the same manner as is the stock supporting tube 12. However, the stock supporting tube 38 extends beyond the outer end of the housing tube 13 with its outer end extending within the interior of the collet actuating sleeve 37, there being a substantial clearance between the interior of the sleeve and the exterior of the stock supporting tube. In this form of the device no filler tube is ordinarily employed and the finger tube 29 is therefore slidably supported upon the exterior surface of the stock supporting tube 38, the finger tube being actuated and operating in the same manner as was previously described with respect to the embodiment illustrated in Figs. 1 to 5. In this form of the device the stock supporting tube now forms the rear support for the finger tube 29 holding it in axial alignment with the collet chuck 36 and the chuck actuating sleeve 37. The fingers 30 on the forward end of the finger tube 29, as before, hug the bar stock and, being closely adjacent the collet chuck 36 which clamps the bar stock, the forward end of the finger tube is held axially aligned within the sleeve 37 so as to prevent the former from striking the latter when the bar stock and stock supporting tube are rotated during operation of the machine tool. While it is contemplated that the structure illustrated in Fig. 6 will normally be employed without the use of a filler tube, such a tube may be employed if it be desired to employ this form of mechanism with bar stock having materially smaller cross section than that of the interior of the stock supporting tube. Such a filler tube would take the form of that illustrated in Figs. 3 and 5 except that it would not extend beyond the forward end of the stock supporting tube.

While the preferred embodiment of the invention and one modification thereof have been described in considerable detail it will be readily apparent that numerous changes may be made while retaining the advantages of the invention. For example, when bar stock of a size such as requires a feeding head instead of spring fingers to effect feeding is to be machined, the basic advantages of the invention may be secured by employing a stock feeding mechanism constructed substantially as shown in either Fig. 5 or 6 with the exception that the finger tube 29 is omitted. The filler tube 21, in the form of the device illustrated in Fig. 5, or the stock supporting tube 38, in the form of the device shown in Fig. 6, then acts simply to support the bar stock within the collet actuating sleeve thereby keeping it in axial alignment and preventing contact between such stock and the collet actuating sleeve. Other modifications and advantages of the invention will readily suggest themselves to those skilled in the art and therefore the invention is not to be considered as limited to the exact constructions here illustrated and described but only as required by the spirit and scope of the appended claims.

Having thus described my invention, I claim:

1. A bar stock feeding mechanism for a machine tool having a hollow spindle equipped with a collet chuck and a chuck actuating sleeve, the said mechanism comprising a tubular housing supported independently of said spindle in axial alignment therewith and longitudinally spaced therefrom, a hollow stock supporting means rotatably mounted in said housing with a portion extending therebeyond and into said chuck actuating sleeve with a substantial radial clearance so that the longitudinal space intermediate said housing and sleeve is bridged by said extending portion, the said stock supporting means being held from axial movement and being adapted to provide a support for bar stock extending therethrough a stock gripping finger tube slidably supported on the extending portion of said stock supporting means and extending into the chuck actuating sleeve with a radial clearance, and means to axially move said finger tube thereby effecting feeding of the bar stock through said chuch without contact of said finger tube with said chuck actuating sleeve so that vibrations of the bar stock and the resulting noise are substantially eliminated.

2. A bar stock feeding mechanism as defined in claim 1 and in which said tubular housing is provided with bearing means adjacent both ends and said stock supporting means includes a tubular member supported in said bearings for rotation relative to said housing and a filler tube supported in said tubular member to rotate therewith, the said filler tube having a central opening therethrough of suitable cross section to receive the bar stock to be fed.

3. A bar stock feeding mechanism for a machine tool having a hollow spindle equipped with a collet chuck and a chuck actuating sleeve, said mechanism comprising a tubular housing supported independently of said spindle and in axial alignment therewith, a stock supporting tube rotatably mounted in said housing and held from axial movement, a filler tube supported in said stock supporting tube to rotate therewith, the said filler tube having a central opening therethrough of suitable cross section to receive the bar stock to be fed and the said filler tube extending beyond the forward end of the stock supporting tube, a stock gripping finger tube slidably supported on said filler tube adjacent the forward end thereof and extending into the chuck actuating sleeve with a substantial clearance, and means to axially move said finger tube thereby effecting feeding of bar stock through said chuck.

4. A bar stock feeding mechanism as defined in claim 3 and in which said filler tube has a removable fit within said stock supporting tube, means to key said filler tube to said stock supporting tube to cause the former to rotate with the latter, and means removably supported on said stock tube and extending radially inwardly relative thereto to prevent axial displacement of said filler tube relative to said stock supporting tube, the last-mentioned means being removed to permit said filler tube to be replaced with a filler tube having a central opening corresponding in cross section with the cross section of the bar stock to be fed, whereby the mechanism may be employed with bar stocks of different cross sections.

STERLING F. WINCHELL.

REFERENCES CITED

The following references are of record in the file of this patent:

UNITED STATES PATENTS

| Number | Name | Date |
|--------|------|------|
| 2,142,557 | Cone | Jan. 3, 1939 |
| 2,178,114 | Eckhardt | Oct. 31, 1939 |
| 2,221,734 | Evans | Nov. 12, 1940 |
| 2,249,561 | Jelinek et al. | July 15, 1941 |